Patented Aug. 14, 1928.

1,681,120

UNITED STATES PATENT OFFICE.

AUGUST J. PACINI, OF CHICAGO, ILLINOIS, ASSIGNOR TO CHARLES M. RICHTER, OF CHICAGO, ILLINOIS.

ANTIRICKETIC SUBSTANCES AND THE PRODUCTION THEREOF.

No Drawing.      Application filed August 24, 1927. Serial No. 215,264.

This invention relates to anti-ricketic products and the like, and with regard to certain more specific features, to the production of anti-ricketic and similar substances.

Among the several objects of the invention may be noted the treatment of substances which elaborate growth-producing substances, hereinafter for brevity termed vitamin $a$, to produce anti-ricketic substances which include the so-called vitamin D, without the use of radiation of wave-length shorter than about 3022 Ångström units.

Another object of the invention is to provide means of the class described, by which commercial production of anti-ricketic food and medicinal products may be practically accomplished on a substantial scale of operations.

Another object of the invention is the provision of improved means for making concentrated water-soluble anti-ricketic medicinal and other products, which include said vitamin D, from merely fat-soluble substances of a corresponding nature.

Another object of the invention is the production of water-soluble fractions adapted to be used hypodermically as anti-ricketic injections.

Other objects will be in part obvious and in part pointed out hereinafter.

The invention accordingly comprises the elements and combinations of elements, steps and sequence of steps, features of construction and arrangements which will be exemplified in the articles hereinafter described, and the scope of the application of which will be indicated in the following claims.

It can be shown that certain growing, living things are apparently sources of a growth-producing substance, apparently related to but not identical with vitamin A, and hereinafter for brevity termed vitamin $a$. The more rapidly growing things, in general, appear to be the best sources of this growth-producing substance, as for example, typhoid bacilli, rapidly growing sarcomata, certain of the fungi, certain of the ascomycetes and others. The various vitamins, under suitable methods of animal experimentation, in which proper adjustment of the inorganic portion of the diet is made, can be shown to accelerate growth. This growth-producing property can be demonstrated for vitamin A, vitamin B, and vitamin D. In addition to the growth-producing properties possessed by the classes of vitamins enumerated, the separate groups show other characteristics by which their distinction becomes possible. Thus, vitamin A is growth-producing, is also anti-xerophthalmic and is considered fat soluble. Vitamin B is growth-producing, anti-beriberic, and water soluble. Vitamin D is growth-producing, anti-ricketic and fat soluble. The classes of materials serving as sources for vitamin $a$ as the term is used in the present application are known to furnish water soluble vitamin B, but the presence of vitamin A, which is probably complex and consists of at least both a growth-producing and an anti-xerophthalmic fraction, has heretofore been considered absent, or present in scarcely appreciable amounts. The matter of suitable extraction of the fat soluble vitamin A is acknowledged to be difficult, certain organic solvents being effective when used with one material and ineffective when used with another. This same difficulty is experienced with the substances designated vitamin $a$. Novel means for accomplishing extractions are given hereinafter.

For example, one of the fungi, agaricus campestris (ordinary meadow-agaric), may be used as a source of growth-producing material (vitamin $a$). For this purpose it is finely minced in its fresh state and extracted with a mixture of acetone and alcohol in the following proportions:

Example 1.

Agaricus campestris (fresh) _____two kilograms
Extractant: alcohol (ethyl,
    absolute) _____500 cc.
    acetone, Kahlbaum (free
    from methyl alcohol) _____1000 cc.

The extraction is made by reflux at reduced pressure in a period of six hours. At the conclusion of the extraction, the solvent is decanted from the residue and is evaporated at reduced pressure in vacuum, whereby a fatty residue is obtained weighing of the order of 0.7833 grams. This residue is dissolved in alcohol (absolute ethyl) in proportions adapted to make a solution, each cubic centimeter of which contains ten milligrams of residue. This alcoholic solution is then treated by shaking with fuller's earth in the ratio of one gram fuller's earth per cubic centimeter of solution and the alcohol permitted to evaporate, thus distributing ten milligrams of agaricus extract throughout one gram of fuller's earth.

The growth-producing, or inducing substance appears now to be transfixed to the fuller's earth, presumably by adhesion, thus affording a comparatively quantitative measure of effectiveness. The earth when fed to rats which have been placed on a growth-free diet, owing to lack of vitamin A, will cause increase in growth, thus demonstrating that a growth-producing substance is present in the extract, this substance belonging presumably to the group of vitamins known as vitamin A. If the extraction is carried on with benzene instead of acetone and alcohol mixture, a larger amount of fatty residue is obtained, weighing of the order of 1.5639 grams. Comparison of the residue obtained by the acetone-alcohol extraction with the residue obtained by the benzene extraction, both residues being fed to experimental rats kept on a diet adequate in every respect save for the absence of vitamin A, discloses considerable anti-xerophthalmic effect in the case of the benzene residue and a negligible anti-xerophthalmic effect in the case of the acetone-alcohol residue, growth-producing properties being present in both instances. It thus appears that vitamin A may be composed of several growth-producing components, the anti-xerophthalmic effect belonging to one of these components, or comprising possibly a separate vitamin. As stated above, for the purpose of brevity, the growth-producing fat soluble and apparently anti-xerophthalmic lacking substance is identified by the special designation vitamin $a$.

The growing things mentioned above and others will produce similar extracts but they are not all equally potent, as the following table shows:

| Substance | Relative growth production power |
|---|---|
| 1. Typhoid bacilli | + |
| 2. Brown rot of peaches | + + |
| 3. Sarcomatous tissue | + + + |
| 4. Agaricus campestris | + + + + |
| 5. Ergot of rye | + + + + + |

As an example of the mode of forming another extract, the following short method is given:

*Example 2.*

Claviceps purpurea (ergot of rye) is extracted in the manner above set forth with an acetone and alcohol mixture (acetone 2, alcohol 1 part). This extract is evaporated at reduced pressure and treated with alcoholic caustic potash solution to saponify the saponifiable fats. These are removed by calcium chloride salting and the remaining filtrate evaporated to dryness. The result is a water-insoluble residue containing vitamin $a$.

The vitamin $a$ extracts obtained from the substances named, that is, typhoid bacilli cultures, brown rot of peaches sarcomatous tissue, agaricus campestris, ergot of rye, and undoubtedly to be obtained also from sources belonging to the classes of which the substances named are but class examples, have been found to be devoid of anti-ricketic property, and therefore, devoid of vitamins of the D group. One of the objects of this invention is to endow the growth-producing quality of substances of the class above set forth, with an anti-ricketic property.

To accomplish the above end, the water-insoluble residues containing vitamin $a$, of the class above set forth, are treated with certain light radiation, excluding therapeutically active ultraviolet radiation. By ultraviolet radiation is meant that radiation which is outside the visible spectrum at its violet end and starts at about 4000 Ångström units to the region of the X-ray at about 500 Ångström units. Converted to units of wave length, this amounts to wave lengths from 0.4 of a micron to 0.05 of a micron of .00004 of a centimeter to .000005 of a centimeter. It is to be understood that I intend to use irradiation including wave lengths below and/or beyond the ultraviolet, that is, longer and/or shorter wave lengths. The salient point is that my method excludes ultraviolet.

Biologically useful ultraviolet radiation is differently designated, the basis for the designation residing in the fact that ordinary window glass is considered opaque to the effective ultraviolet radiations. By effective ultraviolet radiation is meant here that region which is curative for rickets in animals and in humans, and which has been demonstrated to include wave-lengths beginning at about 3022 Ångström units and extending possibly as far as 2000 Ångström units (0.302 to 0.2 microns, or 0.0000302 to 0.00002 centimeters). Ordinary incandescent illuminating sources, such as tungsten filament lamps commonly called Mazda lamps, emit ultraviolet radiation; but inasmuch as these rays must pass through the glass bulb in which the filament is contained, the shorter and biologically effective radiations are obstructed. Such sources of radiation emitting small, subintensive amounts of glass filtered ultraviolet are not considered sources of biologically or therapeutically active ultraviolet radiation in the art. Ultraviolet radiation as the phrase is ordinarily used means radiation of wave-length shorter than that filtered by ordinary glass and such as is obtained from a mercury vapor lamp in quartz, ordinary glass having the effect of removing the necessary radiation.

When the extracted material is obtained, in the manner specified, from substances for which class examples have been set forth, I have discovered that the exposure of such material to certain radiations exclusive of the range which by common consent is defined as designating the biologically and therapeutically active ultraviolet radiation, occasions in the material an apparent conversion of fat soluble vitamin a to fat soluble vitamin D, the growth-producing properties of the vitamin a are lost and become replaced by pronounced anti-ricketic vitamin D properties.

For example, the organic solvent extract from agaricus campestris loses its vitamin a properties and acquires instead anti-ricketic vitamin D properties when exposed to light as follows:

Example 3.

The organic solvent extract containing vitamin a is placed in a covered glass Petri dish, and is exposed 210 or more minutes at 20 inches from a source of radiation including wave-lengths down to about 4000 Ångström units. It is not necessary that the receptacle containing the material to be treated be glass covered, any open receptacle serving just as well. The use of a glass covered receptacle simply establishes the effectiveness of radiations other than those in the region heretofore considered as the sole biologically active ultraviolet region. For example, the intensity of the light used at the source was that obtained from a 1500 watt tungsten filament incandescent "day-light" lamp. To be of maximum effectiveness the radiation must be intensified in the limits of the visible spectrum and must be devoid of ultraviolet. Passing the radiation from a 1500 watt tungsten filament incandescent "day-light" lamp, through a filter opaque to the ultraviolet accomplishes the result. The filter used may be a solution of cupric chloride, five grams of the anhydrous salt dissolved in one liter of water, and contained in a glass trough in a layer approximately three centimeters in thickness. Other methods of filtration may be used, as for example water, or other solutions of different organic, or inorganic dyes and substances, such as picric acid dissolved in water, potassium chromate in water, or cobalt chloride in acetone. Another method of filtration consists in the use of specially prepared glasses, colored, or otherwise made opaque to ultraviolet radiation. Sources of light other than tungsten filament lamps also produce the results, as for example Cooper Hewitt lamps in glass, carbon and other arc lamps. Another method of furnishing adequate radiation consists in the use of relatively monochromatic light sources, such for example as a neon or other gas lamp made incandescent by high frequency currents or other means. Any source of light may be used, even though it is inherently rich in the ultraviolet, if the ultraviolet is screened out before the rays reach the substance being treated. The primary point is that growth-producing substances rich in vitamin a develop anti-ricketic property, or become rich in vitamin D by means of rays more desirable than ultraviolet.

It is to be understood that ordinary sunlight will accomplish the same end, but it is slow in action and inconstant in its intensity. Hence artificial lighting methods are preferable. It is to be understood that artificial lighting methods are to include such as cause a concentration of sunlight beyond its ordinary powers, whereby its efficacious action is increased for the purpose in hand. Examples would include concentrating, refracting lenses and reflecting mirrors. However, in all such cases, as stated above, the ultraviolet rays are to be screened out.

The action of the rays can be interpreted in terms of photo-chemistry and probably involves electronic re-orientation in the atoms of the molecules undergoing activation. By activation is meant, for example, the apparent replacement of at least some of vitamin a with vitamin D, or the production of vitamin D without the pre-existence of vitamin a. I have discovered that energy sources other than ultraviolet radiation of the biologically effective range are capable of producing the activation referred to, such sources including radiation from 3022 to 30,000, Ångströms units which includes the infra-red wave-lengths.

If, as has been suggested in the literature referring to vitamins, a unit of vitamin is accepted as representing that amount which when fed daily, just suffices to support a gain in weight of three grams per week in an experimental animal (white rats of known pedigree, age 25 to 28 days) properly prepared for such testing, the vitamin a content of some of the substances examined appears to be approximately as follows, expressed in units of vitamin per gram of extract of the material:

| Extract from— | Approximate unit of vitamin a per gram of extract | Vitamin D |
| --- | --- | --- |
| 1. Brown rot of peaches | 6,000 | |
| 2. Agaricus campestris | 10,000 | |
| 3. Ergot of rye | 30,000 | |

When subjected to the process by the method just described the following changes take place:

| Extract from— | Approximate unit of vitamin a per gram of extract | Vitamin D approximate unit |
| --- | --- | --- |
| 1. Brown rot of peaches | | 10,000 |
| 2. Agaricus campestris | | 20,000 |
| 3. Ergot of rye | | 60,000 |

The irradiation produces a change in which the amount of vitamin a lost becomes replaced by a proportionate amount of vitamin D gained. This is possibly due to a conversion or transmutation of vitamin a into vitamin D.

Excessive exposures, 400 hours amounting to more than ten times that necessary to produce the vitamin D effect, do not impair the production of vitamin D.

The photosynthesis of anti-ricketic vitamin can be accomplished by exposing suitable material to radiation mentioned whether or not these substances contain vitamin *a*. Thus for example, oleomargarine, a food completely devoid of vitamin A, and devoid of vitamin *a*, becomes anti-ricketic when subjected to the process as illustrated in Example 3 in which the radiation used is infra-red rays, and various grain products such as oats, containing vitamin A and vitamin *a* become anti-ricketic by the same process; in the case of these products, however, without the loss of their anti-xerophthalmic power, where such power already exists.

The reason for treating the growth-producing and like substances with light of wave lengths which exclude the ultraviolet is that a greater amount of material may be treated at one time without the use of impractical and expensive equipment, such as is required when treating with ultraviolet rays. Heretofore treatments have been made on the theory that the ultraviolet ray is the only one which will accomplish the end, but I have discovered that the other rays specified have the desired effect and that the same end can be accomplished more expeditiously therewith. For instance, some of the known ways of producing ultraviolet rays are by means of the quartz mercury vapor lamps, which are expensive and inconvenient devices to operate where commercial operations are to be carried on.

Another point with regard to treatment of substances by ultraviolet rays is to be noted. If food or the like is exposed to these rays for purposes corresponding to the above, especially after inadvertent over-exposure has been made, it has been found that an undesirable bleaching result is had, as well as an undesirable effect which renders the food less palatable and in many instances causes a definite distastefulness. Oils, for example, acquire a decided acridity of taste and smell, making them less pleasingly palatable. By treating the residue or foods impregnated with said residue, or the other classes of substances mentioned with rays other than ultraviolet, the improved desirable anti-ricketic conversion is accomplished, without the undesirable properties attending the use of ultraviolet rays.

Another disadvantage in using ultraviolet rays, not had by using the longer of the other rays prescribed herein, is that operators are subjected to conjunctivitis. By using said longer rays, operators are subjected to no inconvenience or ill effects.

Another object of this invention, per se, and in combination with the above is to convert the water-insoluble residues (fatty residues) above mentioned into water-soluble residues, so that the concentrates made therefrom are more assimilable and may more conveniently be used medicinally, such as in liquid, powder or in tablet form.

An example of how the fatty residue is converted into a water-soluble residue is as follows, starting with the dry filtrate of the second example above, said filtrate having been preferably treated with the radiation described:

Example 4.

The irradiated water-insoluble or fatty residue is treated with a water solution of sodium taurocholate and sodium glycocholate, of the following proportions:

|  | Parts. |
|---|---|
| Sodium taurocholate | 1 |
| Sodium glycocholate | 3 |
| Water | 6 |

A satisfactory solution is effected when the fatty residue is treated with approximately 20 times its weight of solution; thus, for 0.5 gram of fatty residue, 10 cubic centimeters of the solution suffice. The treatment is a digestion, effected in a sealed glass tube immersed in boiling water for at least 8 hours. A dark brown solution, slightly turbid and containing a white sediment results. At the conclusion of the digestion, the solution is filtered and evaporated to dryness. The residue is dissolved in grain alcohol, gentle heating effecting complete solution. Neutral lead acetate is added to the alcoholic solution, which precipitates lead glycocholate. After removing the lead glycocholate by filtration, basic lead acetate and ammonia are added to the remaining alcoholic solution, which precipitates the taurocholate. This is removed by filtration. All excess of lead is removed from the alcohol solution by passing hydrogen sulphide through the solution which is first made faintly acid to litmus with hydrochloric acid. Lead separates out as lead sulphide and is filtered off. The remaining alcoholic solution is evaporated to dryness, and the residue, which is water soluble, is found to be strongly anti-ricketic. For further purification, the residue in water may be dialyzed against water. It is to be understood that other substances may be used to accomplish the conversion, having the properties of sodium taurocholate and sodium glycocholate, such as other derivaties of cholic and similar acids.

It should be understood that the method of converting water-insoluble substances to water-soluble substances can be used independently of the method of converting a growth-producing or other substance into an anti-ricketic substance by said means including the use of non-ultraviolet rays. For instance, extracts of cod liver oil rich in vitamins A and D, may be rendered water-soluble by the process above described, without light treatment, and therefore without having changed their vitamin A content to a vitamin D content and without deleteriously affecting said vitamin D content. Examples could be multiplied.

The water-soluble fractions, obtained by the methods above set out for making an anti-ricketic medicinal product, instead of being evaporated, may be used hypodermically as an anti-ricketic injection, completely capable of affording the anti-ricketic benefits herein described. The injections may be made in amounts up to 2000 milligrams without deleterious effects.

Having described the details of the method for effecting all of the above, the following is to be made clear:

Foods are rendered anti-ricketic, either by applying the growth-producing or like substance or substances to the food by wet or dry mixing and then exposing the thus treated food to the non-ultraviolet rays in order to render said substances anti-ricketic, or the substances may be first rendered anti-ricketic by exposure to said rays and then applied to the food by wet or dry mixing or, the food may be exposed directly to the non-ultraviolet rays, as in the case of oleomargarine. Mixing may be accomplished mechanically or otherwise.

Taking for example oats, they are impregnated with the growth-producing substance (in extract or other form) and then exposed to the non-ultraviolet rays by continuous passage on belts or the like under suitable lamps. Or, they are impregnated with a substance which has been previously rendered anti-ricketic by exposure to said rays or, they are exposed directly to the non-ultraviolet rays.

The same variations of method hold with respect to the manufacture of concentrated medicinal products, although the direct methods, hereinbefore described, are preferable in the case of the manufacture of said medicinal products.

In this application, the term "vitamin D concentrate" refers to a substance having a vitamin D activity of a higher order of magnitude than is found in nature.

In view of the foregoing, it will be seen that the several objects of the invention are achieved and other advantageous results attained.

As many changes could be made in carrying out the above preparations without departing from the scope of the invention, it is intended that all matter contained in the above description shall be interpreted as illustrative and not in a limiting sense.

I claim:

1. The method of preparing materials containing growth-producing substances so that at least some of said growth-producing substances become replaced by anti-ricketic products, said method comprising concentrating on said materials rays longer than about 3022 Ångström units.

2. The method of preparing materials containing growth-producing substances so that at least some of said growth-producing substances become replaced by anti-ricketic products, said method comprising the application of rays longer than about 3022 Ångström units to said materials.

3. The method of preparing materials containing growth-producing substances so that at least some of said growth-producing substances become replaced by anti-ricketic products, said method comprising the artificial application of infra-red rays to said materials.

4. The method of preparing materials containing vitamins $a$ to exchange at least some of said vitamins $a$ for vitamins D, comprising applying rays longer than about 3022 Ångström units to said materials.

5. The method of preparing materials containing vitamins $a$ to exchange at least some of said vitamins $a$ for vitamins D, comprising applying rays to said materials having wave lengths of the order of 3022 Ångström units to about 30,000 Ångström units.

6. The product including a vitamin D concentrate, said concentrate being in water-soluble form.

7. The method of manufacturing an anti-ricketic food comprising extracting a growth-producing substance, treating the growth-producing extracted substance until at least a partial replacement by an anti-ricketic substance is obtained and applying the anti-ricketic substance to a food.

8. The method of manufacturing an anti-ricketic food comprising extracting a growth-producing substance, applying said substance to a food, and treating the growth-producing substance until at least some of it becomes replaced by an anti-ricketic substance, said treatment being accomplished by the application of rays longer than about 3022 Ångström units at a period after said extraction.

9. The method of manufacturing an anti-ricketic food comprising obtaining a growth-producing substance, mixing said substance with a food and treating the mixture until at least part of said growth-producing substance becomes replaced by an anti-ricketic substance, said treatment being accomplished by exposure to infra-red rays.

10. The medicinal product comprising a vitamin D concentrate, said concentrate being in water-soluble amorphous powder form.

11. The medicinal product comprising a vitamin D concentrate in a tablet, said concentrate comprising a water-soluble amorphous powder.

12. The method of manufacturing a medicinal anti-ricketic product comprising extracting a growth-producing substance, treating the growth-producing substance until at least some of it becomes replaced by an anti-ricketic product after extraction, said treatment being accomplished by exposure to rays longer than about 3022 Ångström units.

13. The method of manufacturing a medicinal anti-ricketic product comprising extracting a growth-producing substance, treating the growth-producing substance until at least some of it becomes replaced by an anti-ricketic product after extraction, said treatment being accomplished by exposure to rays longer than about 3022 Ångström units and fractinating the activated product for use hypodermically.

14. The method of manufacturing a medicinal anti-ricketic product comprising the preparation of a growth-producing substance, treating the growth-producing substance to produce an anti-ricketic product, said treatment being accomplished by exposure to rays longer than about 3022 Ångström units, and reducing at least part of the activated product to a water-soluble substance by the use of a cholate derivative.

15. The method of manufacturing a medicinal anti-ricketic product comprising the preparation of a growth-producing substance, treating the growth-producing substance until it becomes replaced by an anti-ricketic product, said treatment being accomplished by exposure to rays longer than 3022 Ångström units, and reducing at least part of the activated product to a water-soluble substance by the use of a cholate derivative and reducing the same to a powder.

16. The method of manufacturing an anti-ricketic product comprising extracting a growth-producing material by means of a solvent, evaporating the solvent, whereby a residue is caused to remain, and treating the residue with a radiation of wave-length longer than about 3022 Ångström units, whereby at least some of the growth-producing substance is replaced by an anti-ricketic product.

17. The method of manufacturing a water-soluble anti-ricketic product comprising extracting a growth-producing material by means of a solvent, evaporating the solvent, whereby a fatty residue is caused to remain, treating the residue with a radiation of wave-length longer than about 3022 Ångström units, whereby at least part of the growth-producing substance becomes anti-ricketic, and treating said fatty residue with a cholate derivative in order to render it water-soluble, whereby said anti-ricketic substance is made more assimilable.

18. The method of manufacturing a water-soluble anti-ricketic product comprising extracting a growth-producing material by means of a solvent, evaporating the solvent, whereby a fatty residue is caused to remain, treating the residue with a radiation of wave-length longer than about 3022 Ångström units, whereby at least part of the growth-producing substance becomes anti-ricketic, and treating said fatty residue with a cholate derivative, whereby said anti-ricketic substance is made more assimilable.

19. The method of manufacturing a water-soluble anti-ricketic product comprising extracting a growth-producing material, thereby producing a residue, treating the residue with radiation of wave-length longer than about 3022 Ångström units, and treating the residue with a cholate derivative.

20. The method of treating materials containing vitamins $a$, to replace at least some of said vitamins with vitamins D, comprising the artificial application of rays longer than about 3022 Ångström units to said materials, whereby said materials are caused to include vitamins D.

21. The method of treating materials containing an anti-xerophthalmic component and an anti-xerophthalmic lacking but growth producing component so that at least part of said anti-xerophthalmic lacking and growth producing component becomes replaced by an anti-ricketic component without deleteriously affecting said anti-xerophthalmic component, comprising concentrating rays on said materials longer than about 3022 Ångström units.

22. The method of treating materials containing an anti-xerophthalmic component and an anti-xerophthalmic lacking but growth producing component so that at least part of said anti-xerophthalmic lacking and growth producing component becomes replaced by an anti-ricketic component without deleteriously affecting said anti-xerophthalmic component, comprising concentrating infra-red rays on said materials, extracting one of the materials by means of a solvent, evaporating the solvent, whereby a fatty residue is caused to remain, concentrating infra-red rays on said residue, and treating the fatty residue with a cholate derivative to render it a water-soluble substance, whereby said anti-ricketic substance is made more assimilable.

In testimony whereof, I have signed my name to this specification this 20th day of August, 1927.

AUGUST J. PACINI.